United States Patent

[11] 3,593,264

| [72] | Inventor | Carl E. Atkins<br>Montclair, N.J. |
|---|---|---|
| [21] | Appl. No. | 742,559 |
| [22] | Filed | July 5, 1968 |
| [45] | Patented | July 13, 1971 |
| [73] | Assignee | Wagner Electric Corporation |

[54] VEHICLE WARNING CIRCUIT
7 Claims, 6 Drawing Figs.
[52] U.S. Cl. .......................................... 340/52,
340/251, 315/82, 340/75
[51] Int. Cl. ........................................ B60q 1/00
[50] Field of Search ................................ 340/52, 79,
521; 315/82, 83

[56] References Cited
UNITED STATES PATENTS

| 3,271,736 | 9/1966 | Brown et al. | 340/251 |
| 3,408,625 | 10/1968 | Skinner | 340/79 |

*Primary Examiner* — John W. Caldwell
*Assistant Examiner* — Howard S. Cohen
*Attorney* — Eyre, Mann and Lucas ABSTRACT: A warning circuit is provided for informing the operator of a vehicle when a remotely positioned vehicle lamp fails to light. The circuit includes a sensing circuit having a plurality of resistors connected in series with the lamps. A semiconductor circuit is coupled to the resistors and transmits an electrical signal to a warning means which may include a lamp or/a buzzer. The circuit can be made to operate at any time the lamp switch is turned on. Operation of the circuit may be also limited to the condition when the ignition switch is turned on.

INVENTOR
CARL E. ATKINS

INVENTOR.
CARL E. ATKINS
BY Eyre, Mann & Lucas

ATTORNEYS

VEHICLE WARNING CIRCUIT

The present invention includes a sensing circuit having three series resistors connected in series with one, two or three lamps. If less than three lamps is used, the number of series resistors is correspondingly varied. When any one of a number of lamps burns out, a semiconductor circuit senses the change in current and warns the operator of the vehicle. The circuit may be varied to include different types of warning signals and can be made to operate at certain times, depending upon the condition of other circuit components.

One of the features of the present invention is to provide a compact small semiconductor circuit enclosed in a metal container which may be positioned near the lamps at the rear of the vehicle. The metal container has electrical connection points at one end to receive connecting members from that part of the circuit not mounted within the container. The metal container is provided with a ground connection whereby the metal container can be electrically grounded to the vehicle body. This is preferably accomplished by use of a metal clip adapted to be attached to the vehicle body and to receive and releasably hold the container. The use of such a clip allows the metal container to be easily removed from the vehicle for simplified maintenance or repair.

The metal container is provided with a plurality of electrical connection points, one for the semiconductor switch input, another for the power input by which the circuit within the container is energized, and three others for monitoring alternatively and selectively one, two or three vehicle lamps.

According to the instant invention, a circuit capable of monitoring a given maximum number of lamps can be used to monitor lesser numbers of lamps by varying the number of series resistors in the circuit. This is accomplished by connecting the series resistors to the connection points which receive the lamp monitoring input whereby each lamp connection point provides a different resistance to be placed in series with the lamps. Each lamp connection point therefore corresponds to the number of lamps the circuit is to monitor. Accordingly, only one connection point corresponding to a lamp input is used at any one time so that if only one lamp is to be monitored, a given single connection point will be used, while if two lamps are to be monitored, a different single connection point will be used, etc.

The geometries of the three types of connection points, namely those that receive the lamp monitoring input, the semiconductor switch input and power input, are different so as to preclude accidentally connecting one of the types to the wrong connection point.

In the preferred embodiment, the connection points which receive the lamp monitoring input are male extensions from the container and the connection point which receives the semiconductor switch input is also an extension from the container body, but is female rather than male. The connection point which receives the power input is an opening in the container rather than an extension. It is therefore impossible to accidentally connect one type to the connection point of another.

It will be seen that the above metal container provides virtually foolproof mounting for the circuit in the vehicle and assures correct reinstallation in the event the container is removed for servicing or repair or is replaced.

For a better understanding of the present invention, together with other details and features thereof, reference is made to the following description taken in connection with the accompanying drawings.

FIG. 1 is a schematic diagram of connections showing one form of the invention. In this circuit the warning lamp is not lighted unless the ignition switch is turned on.

Figure 1:
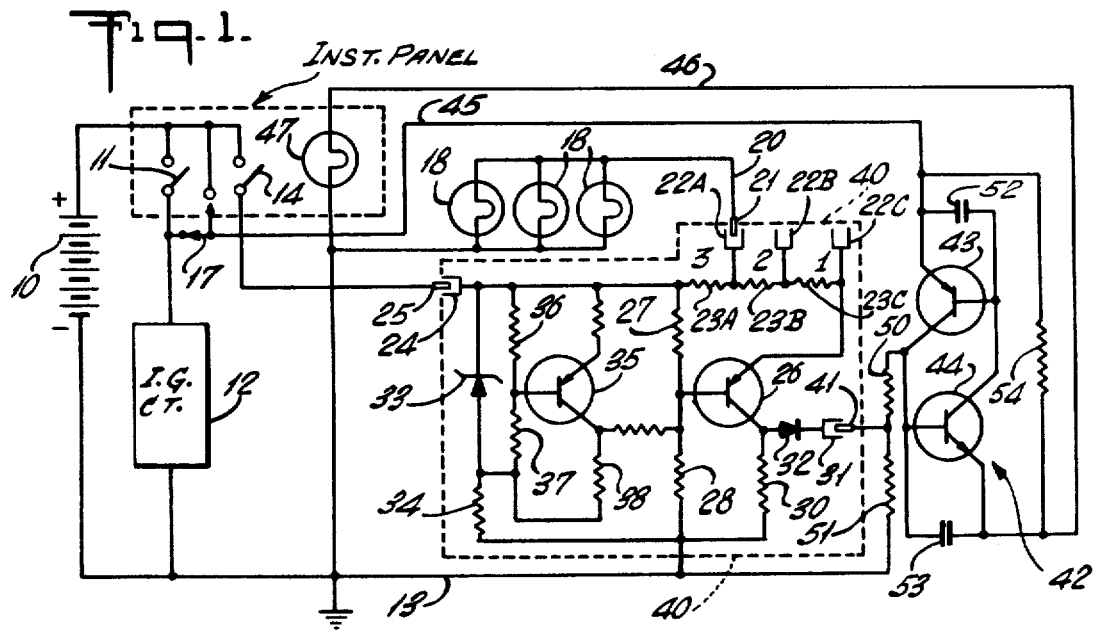

One preferred embodiment of the invention is shown in FIG. 1 where a vehicle storage battery 10 furnishes the power for the ignition and all the lamps. An ignition switch 11 is connected in series between the positive terminal of the battery 10 and an ignition circuit 12. The other end of the ignition circuit is connection to a ground conductor 13 and the negative terminal of the battery 10. In this circuit the warning signal may be adjusted to operate any time the ignition switch is closed and the lamp switch 14 is closed, the latter being for example a parking lamp switch. There may be times when it is desired to operate the warning signal independently of the condition of the ignition switch 11. A switch 17 may be installed under the instrument panel and turned to apply the full battery voltage to the alarm circuit at all times.

In FIG. 1 three parking lamps 18 are indicated. One side of each of the lamps is connected to the ground conductor 13 is the usual manner while the other side of each lamp is connected to a conductor 20 which terminates in a connector lug 21. This lug may be positioned in any one of three sockets 22A, B or C. Connectors 22 are connected to three series resistors 23A, B or C and the opposite end of resistor 23A is connected to a socket 24 which is arranged to receive a plug 25 connected to one side of the lamp switch 14.

The sensing circuit includes a transistor 26 having its base electrode connected to the midpoint of a voltage divider including resistors 27 and 28. The emitter electrode is connected to socket 22C and one end of resistor 23C while the collector electrode is connected to resistor 30 and to a diode 32 in series with an output socket 31.

The warning circuit is intended primarily for use on trucks which may have many parking or signal lamps at remote locations not within the view of the operator. Such a vehicle is provided with a storage battery which may vary over a considerable range of voltage. In order to compensate for these voltage variations, a compensating transistor stage is connected to the sensing circuit including a zener diode 33 connected across the battery terminals in series with a dropping resistor 34. A compensating transistor 35 is also coupled between the zener diode and the sensing circuit in order to compensate for temperature changes.

The base electrode of transistor 35 is connected to a voltage divider including resistors 36 and 37, this divider being bridged across the zener diode 33 and maintained at a constant voltage. The collector electrode of transistor 35 is connected in series with a resistor 38 and for this reason the current through the transistor and the voltage across resistor 38 is dependent only upon the temperature of the transistor. Transistors 26 and 35 are mounted within a small metal container 40 and the temperature of each rises and falls in unison, depending upon the current and the ambient temperature. The extent of the metal container 40 is shown by dotted lines in FIG. 1 and one form of useful container is illustrated in FIGS. 3—6 which will be specifically described hereinafter.

The output of the sensing circuit is delivered through socket 31 and a plug 41 to a semiconductor switch 42 which has only two stable states. The switch 42 includes a PNP transistor 43 and an NPN transistor 44 with a positive regenerative feedback which includes a connection between the base electrode of each transistor and the collector electrode of the other transistor. The switch is normally nonconductive but when a small positive signal is applied to the base of transistor 44, it becomes conductive and, because of the feedback circuits, the entire switch conducts. After conduction has been established, the circuit remains conductive until the battery current (through switch 11, conductor 45, return conductor 46, and warning lamp 47) has been cut off.

There is considerable noise in every vehicle electrical system. Some is derived from the ignition system and other noise sources are caused by switching transients generated by the normal operating signalling means. In order to prevent the noise pulses from triggering the switch 42, a time delay and a high frequency filter have been made part of the switch. A voltage divider, including resistors 50 and 51, is bridged across the ground conductor 13 and the base electrode of transistor 44. Also, capacitors 52 and 53 are connected across the base and emitter electrodes of each of the switch transistors 43, 44. A resistor 54 is connected across the emitter electrodes of each transistor to provide a residual voltage upon lamp 47, insufficient to light the lamp, but sufficient to provide a back bias upon the transistor switch 42 which must be overcome in order to render the switch conductive. The result of these added circuit elements is that high frequency transients will be absorbed by the capacitors 52 and 53 and a definite steady state voltage greater than the back bias potential must be applied to plug 41 for a short time interval before the switch 42 is made conductive.

The operation of this circuit is as follows:

With the ignition switch 11 open and the lamp switch 14 open, no potential can be applied through connectors 24, 25 to activate the switch 42. If switch 11 is closed, as it must be during the running of the engine, positive voltage is applied to conductor 45 and the switch circuit 42. With the ignition switch 11 closed and the lamp switch 14 closed, the sensing circuit and the switch 42 are rendered capable of functioning, depending upon the potential drop in resistors 23.

If all three lamps 18 are burning and plug 21 is inserted into socket 22A, as shown in FIG. 1, then the potential drop across resistor 23A is sufficient to lower the potential of the base of transistor 26, as compared to its emitter, so that the current through the collector-emitter electrodes is quite small and the potential drop across resistor 30 is less than the voltage required to trigger switch 42. Under these circumstances, no signal is transferred and the warning lamp 47 is not lighted. However, if one or more lamps are burned out, the current through resistor 23A is not sufficient to create a suitable standoff potential between the base and emitter electrodes of transistor 26. Therefore, current will flow through the emitter resistor 30 and generate sufficient voltage to trigger switch 42 and make both transistors 43 and 44 conductive. Current then flows from the positive terminal of the battery, through switches 11 and 17, over conductor 45, through both transistors 43 and 44, back over conductor 46, through the warning lamp 47, lighting it, and then to the negative terminal of battery 10. Lamp 47 will remain lighted, even if the burned out lamp 18 is replaced, until the ignition switch 12 is opened. A reset switch may be placed in series with either conductor 46 or 45, if desired, to normalize switch 42.

If the sensing circuit, enclosed by dotted lines 40, is used to monitor the condition of only two lamps 18, the plug 21 is inserted into socket 22B and the same potential drop is applied to the collector and base electrodes of transistor 26. If only one lamp 18 is to be sensed, plug 21 is inserted into socket 22C.

On some types of vehicles there are as many as nine auxiliary lamps and to accommodate this condition, three sensing circuits 40 are necessary. Only one switch 42 and one warning lamp 47 are used.

Figure 2:
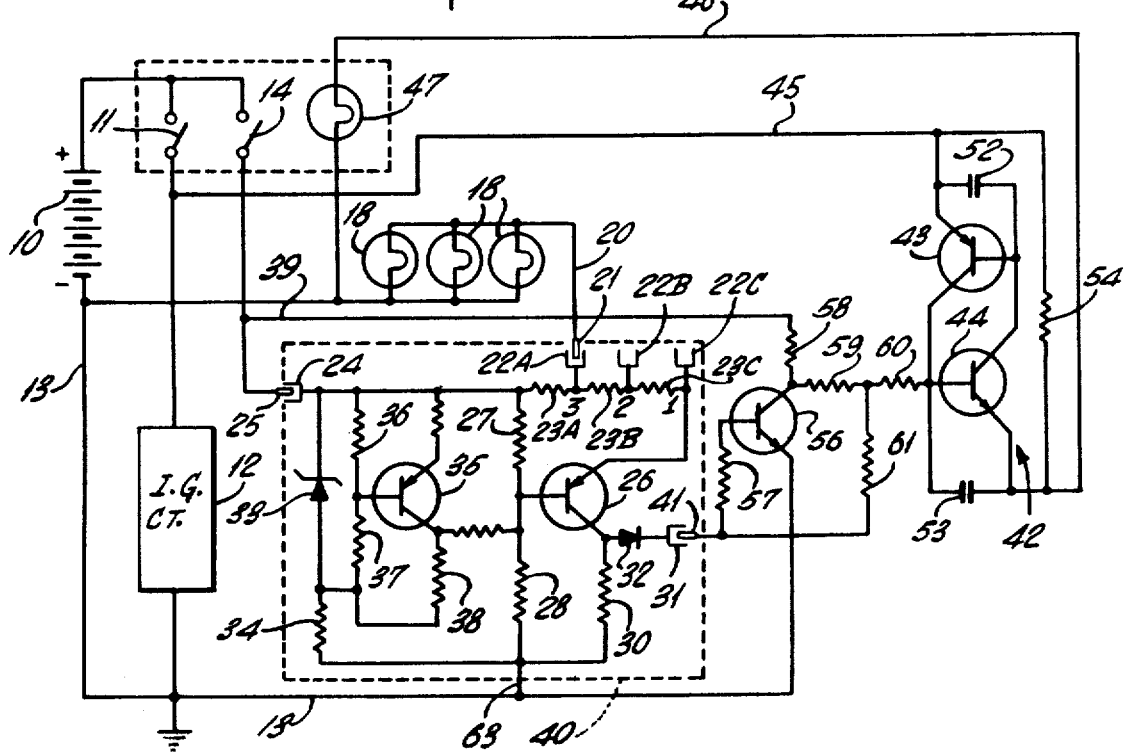
FIG. 2 is a schematic diagram of connections of a similar circuit in which an additional warning stage is included.

Referring now to FIG. 2, the circuit shown includes the same battery 10, the ignition switch 11 and circuit 12, and the common ground conductor 13. The sensing circuit 40, which includes the voltage and temperature compensators, is also the same but an additional transistor stage has been added between the sensing circuit 40 and the semiconductor switch 42. This additional stage includes a transistor 56 having its base electrode connected to plug 41 in series with a limiting resistor 57, its collector electrode connected to the light switch 14 in series with a dropping resistor 58, and its emitter electrode connected to the ground conductor 13 and the negative terminal of the battery 10. The output of this stage is derived from the collector electrode which is connected to the base of transistor 44 in the switch combination 42 in series with resistors 59 and 60. Also, a shunt connection is made from the plug 41 to the junction point of resistors 59 and 60, this shunt including resistor 61.

The operation of this circuit is substantially the same as the circuit shown in FIG. 1 except for the added circuit components. When switches 11 and 14 are closed, the signal lamps 18 are lighted and a small current flows from switch 11 over conductor 45, through resistor 54, then over conductor 46 to lamp 47 and the negative terminal of the battery. When switches 11 and 14 are closed, the sensing circuit 40 is activated and current is sent over conductor 39, through resistor 58 and the collector-emitter electrodes of transistor 56 to ground. Since transistor 56 is normally conducting, it shorts the input to switch 42 and the switch is not made conductive. As before, capacitors 52 and 53 delay the actuation of switch 42 so that short transients and random noise do not make the switch conductive. The operation of the sensing circuit 40 is the same as described above except that the resistor values are altered so that a constant residual voltage of about 1 volt is always present at socket 31 when all the lamps are burning. Five volts are required to actuate the switch circuit 42 and light the warning lamp. When a lamp 18 goes out, the current through resistor 30 raises the voltage at socket 31 and an actuating voltage is supplied to switch 42 through resistors 61 and 60. In addition, the base electrode of transistor 56 is raised in voltage but this action has little effect on the circuit.

The added coupling circuit is provided to light the warning lamp whenever one of the plug and socket connections has come apart or when the circuit has not been properly set up. If the plug 25 is removed from socket 24, all the lamps 18 will be extinguished since there is no battery power available. No current can then flow through resistor 30 and there would be no warning signal if the circuit shown in FIG. 1 is used. However, transistor 56 has its collector connected to the battery 10 and, when the voltage of its base electrode is reduced to ground potential, no current flows through the emitter-electrodes and current can then flow through resistors 59 and 60 to activate the switch 42, lighting the warning lamp.

If the connector plug 21 is removed from any of the sockets 22A, B or C, all of the lamps will go out and there will be no voltage drop across any of the resistors 23. Transistor 26 then conducts and sends a direct current signal through resistor 61 to activate the switch.

If plug 41 is removed from socket 31, the base electrode of transistor 56 is left floating and no current flows through its collector-emitter electrodes. Again, since there is no bypass around the switch input, current flows through resistors 59 and 60 to activate switch 42 and light lamp 47.

The ground connection, designated 63 in FIG. 2, is made through the clip and grounded support. If the metal envelope is detached from the clip, the ground connection will be broken and, if there is no supplementary circuit 56, the sensing circuit 40 is made nonoperative. With the added supplementary circuit, the semiconductor switch 42 is made conductive and the warning lamp 47 is lighted. This action occurs because the circuit from the positive battery terminal, through switch 14, resistor 58, and transistor 56 to ground is broken and transistor 56 is made nonconductive. Current through resistors 59 and 60 activates switch 42 and lights the warning lamp.

The circuit constants used in the supplementary circuit are as follows, assuming that the voltage of the battery 10 lies within the range of 10 to 16 volts:

| Resistor 30 | 100,000 ohms |
|---|---|
| Resistor 57 | 47,000 ohms |
| Resistor 58 | 100,000 ohms |
| Resistor 59 | 1 megohm |
| Resistor 60 | 470,000 ohms |
| Resistor 61 | 330,000 ohms |

Figure 3:
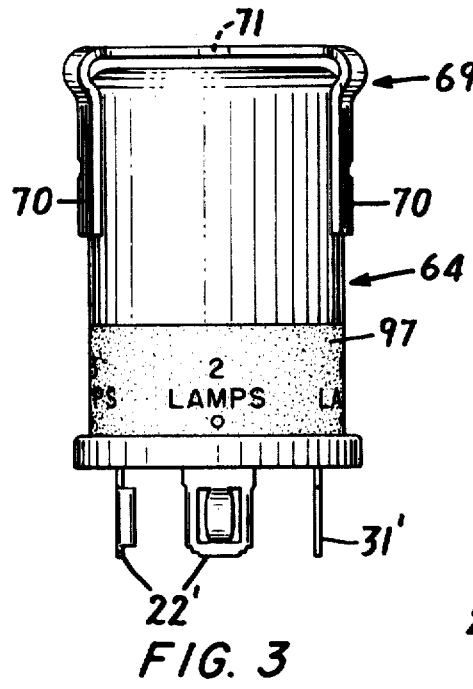
FIG. 3 depicts a container for the circuit of FIG. 1 or 2, for mounting the container to an electrical ground surface.

Referring to FIG. 3, the metal container 64 is provided with a plurality of electrical extensions >',–'. The extensions are adapted to connect the circuitry within the container to external circuitry in a manner hereinafter described.

The metal container 64 contains that part of the circuit of FIGS. 1 or 2 enclosed by the dashed line 40, the circuit 40 being mounted to an epoxy or similar insulative board 65 which is in turn soldered to a terminal 66. The other end of board 65 has a wire 67 attached thereto. The wire 67 is connected at its other end to the metal container 64 at 68 to provide a ground connection between the circuit 40 and the container.

A conductive spring clip 69 is adapted to receive the container 64 and releasably hold it by the spring action of the arms 70. The spring clip has an opening 71 in the top thereof to receive an electrically conductive screw (not shown) which mounts the spring clip 69 to the vehicle body.

The vehicle body provides the circuit ground to which conductor 13 is attached in FIGS. 1 and 2, the ground connection from the circuit board 65 comprising the wire 67, the container 64, and the spring clip 69.

As indicated, circuit board 65 is mounted to terminal 66, preferably by soldering. The terminal 66 is composed of an insulated threaded portion 72 adapted to receive a nut 73 and a clamping washer 74. The bottom portion 75 of the terminal 66 is larger in cross section than the threaded portion 72, and is counterbored at 78. Extending through the terminal 66 is a bore 76 having a conductive sleeve 77 inserted therein. The conductive sleeve is soldered to the terminal board at one end to mount the circuit board to the terminal 66. The sleeve 77 is also adapted to receive a mating conductive pin 79 at its other end.

The conductive pin 79 is part of a terminal plug 25 which has the pin 79 attached to a base 80, the base being larger in cross section than the pin 79. The base 80 carries the power line from the switch 14 of FIG. 1 or 2 and is adapted to mate with counterbore 78 is the base 75 of the terminal 66.

The terminal 66 is mounted to an insulative plate 81 by inserting the threaded portion 72 of the terminal 66 into opening 82. The cross section of opening 82 is smaller than the cross section of base 75 so that the base 75 will not go through the opening, but will instead seat against the bottom surface of the plate 81. The base 75 is held in position in the plate 81 by the clamping washer 74 which is piloted over the threaded portion 72 to rest against the upper surface of the plate 81 and the nut 73, the latter being threaded onto threaded portion 72 and tightened against the clamping washer to secure the terminal 66 firmly in place on the plate 81. After this operation is complete the circuit board 65 is soldered to the conductive tube 77 and the wire 67 is soldered to the container at 68 to complete the basic structure.

The plate 81 carries a plurality of electrical extensions 22', 31' equal to one more than the number of lamps that the circuit is capable of monitoring. In this particular embodiment, the circuit is capable of monitoring three lamps so that the extensions are four in number. The extensions 22' are three in number and are similarly constructed while the extension 31' is constructed differently from the extensions 22'.

Figure 5:
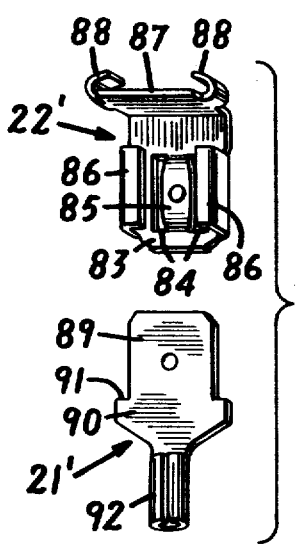

Extension 22' is depicted in FIG. 5. The extension 22' is composed of a main body 83. Metal is removed from the main body 83 at 84 to leave a single strip of metal 85 joined at its top and bottom to the main body 83. The strip 85 is bent inwardly for reasons to be hereinafter described.

The main body portion 83 has two wings 86, one on each side of the main body 83 which are bent around in front of the main body to provide a slot within which a mating connector 21', is guided and held frictionally by the inwardly bent strip 85. Mounted perpendicularly to the main body 83 is a flat plate 87 which has a pair of wings 88 bent upwardly to engage a pair of slotted openings (not shown) in plate 81 (FIG. 2). The wings 88 hold the main body 83 in place against the plate 81 and when installed, carry the resistors 23A, 23B, 23C (FIGS. 1 and 2) thereon, as well as the wire of diode 32 (not shown) and the wire connecting resistor 27 to resistor 23A (not shown).

The mating connector 21' has a flat body portion 89 which is widened at 90 to form a shoulder 91 which seats against the lower portions of the wings 86 of the extension 22'. The lower part of connector 21' is a formed cylinder 92 within which a wire (not shown) is mounted by crimping the cylinder 92 to the wire.

Flat portion 89 of the mating connector 21' is pushed into the extension 22' between the wings 86 and the main body portion 83 until shoulder 91 contacts the lower portion of the wings 86. The flat portion 91 contacts the lower portion of the wings 86. The flat portion 89 pushes strip 85 outwardly, the outward displacement of strip 85 resulting in a friction holding force being applied by strip 85 to flat portion 89, thereby assuring a tight connection between connector 21; and extension 22'.

Figure 6:
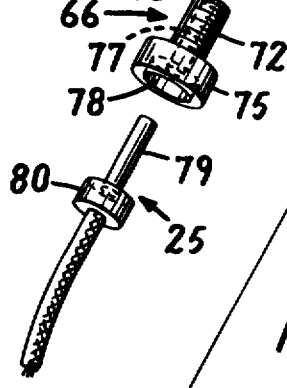
FIGS. 5 and 6 are isometric views of the electrical connectors extending outwardly of the container with the associated external circuit clips which mate with these connectors.

FIG. 6 depicts an extension and mating connector 31' and 41' geometrically different from the extension and mating connector 22' and 21' of FIG. 5. The extension 31' and connector 41' are essentially the reverse of the extension and mating connector of FIG. 5. The extension 31' has an upper flat portion 93 and a reduced width lower flat portion 94, the combination forming a shoulder 95 between upper and lower portions. Mounted perpendicularly to the upper portion 93 is a flat plate 87 having bentup wings 88 thereon, the wings 88 mating with corresponding openings (not shown) in the plate 81 (FIG. 2). The wings 88 and plate 87 serve the same function here as they do for the extension 22' in FIG. 5 and accordingly are referred to by the same numerals.

The mating connector 41' which mates with the extension 31' is similar to the extension 22' of FIG. 5 and accordingly, like numerals are used to indicate like parts. The major difference between connector 41' and extension 22' is that the flat plate 87 and wings 88 of extension 22' have been eliminated and a cylindrical portion 96 substituted therefor which is crimped to a wire (not shown).

The circuits shown in FIGS. 1 and 2 are used to monitor alternatively and selectively one, two or three vehicle lamps. Accordingly, FIGS. 1 or 2 depict a plurality of sockets 22A, 22B and 22C which receive the plug 21. If three lamps are to be monitored, socket 22A is used. If two lamps or one lamp are to be monitored, then socket 22B or 22C respectively, is used. Only one of the three sockets is used at any one time, the socket used depending on the number of lamps the circuit is monitoring. The sockets labeled 22A, 22B and 22C correspond to the extensions 22' of FIGS. 3 and 4 and are all constructed in accordance with FIG. 5.

Figure 4:
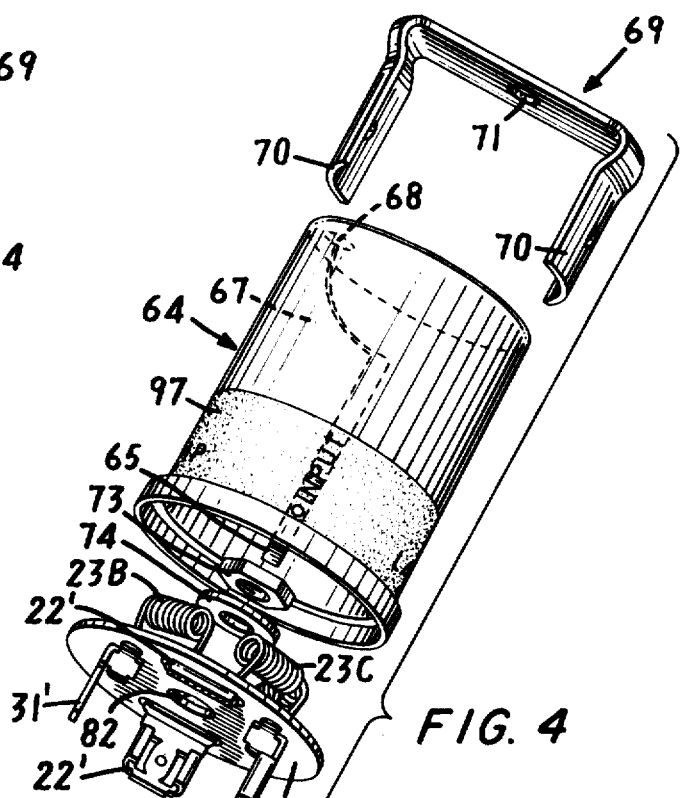
FIG. 4 is an exploded view of the container of FIG. 3 and its associated components.

A fourth socket indicates at 31 in FIGS. 1 and 2 in the form of extension 31' in FIGS. 3 and 4. Extension 31' receives the semiconductor switch input and must always be connected to the switching circuit regardless if a one, two or three lamp system is being monitored. Therefore, the extension 31' is geometrically different from extensions 22' so that the mating connector 21' cannot accidentally be connected to the switching circuit extension 31'.

FIG. 3 depicts the container 64 with a label 97 thereon containing the legend 3-lamp; 2-lamp; 1-lamp. Not shown on the label because it occurs in back of the container is the legend "input". Each part of the legend refers to an extension connected to the container 64 just below the part of the legend that pertains to that extension. Therefore, the lamp output connector 21' will always be connected to the proper extension 22' corresponding to the number of lamps the circuit is monitoring as long as the user follows the simple directions provided by the legend.

The legend "input" is provided to indicate on which extension the switching circuit connector 41' is to be mounted. This is not altogether necessary and can be eliminated in the preferred embodiment since in the preferred embodiment, the switching circuit extension is geometrically different from the lamp input extensions so that the lamp input connector 22' cannot be mounted to the switching circuit input extensions 31' and the switching circuit connector 41' cannot be mounted to the lamp input extensions 22'.

The extensions 22' and 31' can be used interchangeably as long as the extensions that receive the lamp output are not the same as the extensions that receive the switching circuit input.

Power is fed to the circuit within the container through the terminal 66 of FIG. 4 by terminal plug 25. The geometry of these portions of the structure will not allow the terminal plug 25 to be mounted to any of the extensions 22' and 31' so that no mistake can be made in connecting the power source to the circuit within the container.

It is contemplated that the power input to the circuit can be connected to an extension rather than an opening in the container as long as the power input extension is different from the lamp input switch and switch input extensions to prevent accidentally connecting the power source to the wrong extension.

It is clear from the above that the switch input to the circuit can be mounted to only one extension and that the power input in the preferred embodiment cannot be mounted to any of the extensions, thereby guarding against mistakes in connecting the switching circuit and the power source to the circuit within the container. Similarly, the legend printed on the container in the preferred embodiment indicating which extension 22' receives the lamp connector 21' will avoid mistakes in connecting the lamp monitoring input connector 21' to the correct one of the extensions 22'.

The foregoing disclosure and drawings are merely illustrative of the principles of this invention and are not to be interpreted in a limiting sense. The only limitations are to be determined from the scope of the appended claims.

What I claim is:

1. A vehicle warning circuit for producing a warning whenever a lamp is not passing current comprising; a source of direct current power; an ignition switch for supplying current from the power source to an ignition circuit to operate the vehicle engine; a plurality of lamps connected in parallel on the vehicle which are lighted for signalling purposes; a lamp switch connected between the power source and the lamps for lighting them; a plurality of resistors connected in series with the lamps for supplying a potential drop which is responsive to the current through the lamps; a sensing circuit that includes a sensing transistor having its collector electrode and its base electrode connected across the resistors, said transistor being arranged to generate an output signal only when the voltage drop across said resistors is less than a predetermined voltage, said lowered voltage indicating that at least one lamp is not passing current; and a semiconductor switch having its input terminals coupled to the sensing circuit and its output connected in series between a warning device and the power source.

2. A warning circuit as claimed in claim 1 wherein a portion of the sensing circuit is connected to the junction of the ignition switch and the ignition circuit, said connection applying a positive voltage to the sensing circuit for operating it only when the ignition switch is closed.

3. A warning circuit as claimed in claim 1 wherein the warning device is a lamp mounted to be viewed by an operator of the vehicle.

4. A warning circuit as claimed in claim 4 wherein a plurality of sockets are provided at the junction point of said resistors for connection to the signal lamp circuit, said sockets providing an adjusting means for matching the potential drop through the resistors to the number of signal lamps in the circuit.

5. A warning circuit as claimed in claim 1 wherein the base electrode of said sensing transistor is coupled to the collector of a compensating transistor stage, said compensating transistor mounted in close proximity to the sensing transistor for attaining the same temperature as the sensing transistor, said connection between the compensating and sensing transistors for adjusting the voltage bias on the sensing transistor to maintain its sensitivity at all operating temperatures.

6. A warning circuit as claimed in claim 1 wherein said semiconductor switch includes a PNP transistor and an NPN transistor with the collector electrode of each transistor connected to the base electrode of the other transistor.

7. A warning circuit as claimed in claim 6 wherein a capacitor is connected across the base and emitter electrodes of each transistor in the semiconductor switch for passing high frequency impulses and for delaying the actuation of the switch.

UNITED STATES PATENT OFFICE
CERTIFICATE OF CORRECTION

Patent No. 3,593,264                     Dated July 13, 1971

Inventor(s)    Carl E. Atkins

It is certified that error appears in the above-identified patent and that said Letters Patent are hereby corrected as shown below:

Column 1, under the title insert:

Prior art warning circuits have included pilot lamps on the instrument panel of automotive vehicles, but these pilot lamps were not capable of indicating the failure of any one lamp in a group of signal lamps. Other systems that have been proposed include use of a series of glass fiber cables, so-called "light pipes", extending and conducting light from each monitored lamp to a position where the operator of the vehicle can observe the conducted light and its absence upon failure of a monitored lamp. This system is expensive and in the case of trailer trucks is entirely too complicated.

Column 2, line 19, "is", second occurrence, should read -- in --. Column 4, line 70, "22 -- ." should read -- 22′, 31′. --. Column 5, line 30, "78 is" should read -- 78 in --. Column 6, line 42, "indicates" should read -- is indicated --. Column 7, line 6, "switch", first occurrence, should be omitted. Column 8, line 14, "claim 4" should read -- claim 1 --.

Signed and sealed this 3rd day of October 1972.

(SEAL)
Attest:

EDWARD M. FLETCHER, JR.                    ROBERT GOTTSCHALK
Attesting Officer                              Commissioner of Patents